United States Patent [19]
Choi

[11] Patent Number: 5,828,635
[45] Date of Patent: Oct. 27, 1998

[54] OPTICAL PICKUP APPARATUS CAPABLE OF TRANSFERRING OBJECTIVE LENS IN OPTICAL AXIAL DIRECTION DEPENDING ON THICKNESS OF DISC FOR FOCUSING RESPECTIVELY ONTO DISCS WITH DIFFERENT THICKNESSES

[75] Inventor: Hwan-Moon Choi, Seoul, Rep. of Korea

[73] Assignee: Daewoo Electronics Co., Ltd., Seoul, Rep. of Korea

[21] Appl. No.: 656,876

[22] Filed: May 30, 1996

[30] Foreign Application Priority Data

May 31, 1995 [KR] Rep. of Korea ................... 1995-14153

[51] Int. Cl.⁶ ................................................. G11B 7/095
[52] U.S. Cl. .................... 369/44.14; 369/44.27; 369/58
[58] Field of Search .................. 369/44.11, 44.14–44.16, 369/44.27, 44.29, 54, 58

[56] References Cited

U.S. PATENT DOCUMENTS

| | | | |
|---|---|---|---|
| 4,322,838 | 3/1982 | Neumann | 369/44.11 |
| 4,761,773 | 8/1988 | Okada et al. | 369/44.29 |
| 5,157,555 | 10/1992 | Reno | 369/44.11 X |
| 5,263,013 | 11/1993 | Kang | 369/44.14 X |

*Primary Examiner*—W. R. Young
*Attorney, Agent, or Firm*—Sixbey Friedman Leedom & Ferguson; Frank P. Presta

[57] ABSTRACT

In optical pickup apparatus, a laser beam generated from the laser source is reflected from a beam splitting means via an objective lens toward an optical disc. The beam reflected from the disc is received so that information is reproduced. An objective lens positioning system is located around the objective lens, and has rack gears, pinion gears, and a fixed supporting part having a guide rail formed thereon. A motor driving part detects a thickness of the disc to move the objective lens positioning system when the disc is changed in thickness.

5 Claims, 4 Drawing Sheets

OPTICAL PICKUP APPARATUS CAPABLE OF TRANSFERRING OBJECTIVE LENS IN OPTICAL AXIAL DIRECTION DEPENDING ON THICKNESS OF DISC FOR FOCUSING RESPECTIVELY ONTO DISCS WITH DIFFERENT THICKNESSES

BACKGROUND OF THE INVENTION

1. Field of the Invention

The present invention relates to an optical pickup apparatus having an objective lens positioning system. More particularly, the present invention relates to an optical pickup apparatus having an objective lens positioning system in which the objective lens is transferred by a transferring means mounted at the objective lens so that accurate focusing is carried out when the disc is changed in thickness.

2. Description of the Prior Arts

Data recording/reproducing apparatuses using optical disks such as a laser disk (LD) and a compact disk (CD) have been commercially available in recent years. In order to read out data from an optical disk, a laser beam is irradiated onto a data recording track (to be referred to as a "track" hereinafter), and data are reproduced based on the beam reflected by the track.

When the tracks are helically formed on the optical disk, since the sectors of a single track are not equidistant from the center of the rotation of the disk, tracking (radial) control is necessary in the read mode to accurately irradiate the track with a laser beam. Even if the tracks are concentrically formed, sectors of a single track are not equidistant from the center of the rotation of the disk due to the eccentricity in the disk, and therefore, tracking control is essential. This tracking control has been conventionally performed by one beam method or three beam method.

Meanwhile, since the distance from the optical pickup to disk shifts minutely in the read mode in which the disk is rotated, it is difficult to correctly read data due to the shift, thus rendering focusing control essential. This focusing control has been conventionally performed by astigmatic method using astigmatism or a knife edge method.

As a typical conventional example of a tracking circuit, a lens tracking circuit may be mentioned wherein an objective lens is moved in response to a tracking error signal derived from the beam reflected by or transmitted through an optical disk, e.g., one beam or three beams formed from a beam irradiated from the laser by the one beam method or three beam method. The objective lens is normally supported and fixed by a spring on an optical head housing. A tracking actuator is energized to move the lens for the tracking control. When the tracking actuator is deenergized, the lens is held at a mechanically neutral point balanced by a spring force.

When the track eccentricity exceeds twenty or thirty microns, the objective lens deviates greatly from the mechanically neutral point, thereby combining an optical offset signal with the tracking error signal. The laser beam then traces a wrong track in response to the optical offset signal. In order to eliminate the optical offset signal, a tracking system called a two-step servo system has been developed, as described in U.S. Pat. No. 4,761,773. According to this system, the carriage and hence the optical pickup itself as well as the objective lens are moved to perform cooperative tracking.

Meanwhile, as a typical conventional example of a focusing circuit, a lens focusing circuit may be mentioned wherein an objective lens is moved in response to a focusing error signal derived from laser beam which is irradiated from laser source and then reflected by or transmitted through an optical disk. The objective lens is normally the same lens that is used for the tracking control. A focusing actuator is energized to move the lens for the focusing control. When the focusing actuator is deenergized, the lens is held at a mechanically neutral point balanced by a spring force.

The conventional optical pickup actuators are classified into actuators of two types. The objective lens is moved in vertical (focusing) direction and horizontal (tracking) direction using optical pickup actuator.

For example, as shown in FIG. 1A, there is one type that focusing and tracking coils are placed in the orthogonal and parallel direction, respectively. In this case, when focusing control signal F is applied to the focusing coil, the objective lens is moved up and down, and when tracking control signal T is applied to the tracking coil, the objective lens is moved right and left.

Furthermore, as shown in FIG. 1B, there is the other type that the two coils are placed in directions which are 45°/45° against optical axis respectively. In this case, when the difference of focusing control signal F and tracking control signal T is applied to the A coil, the sum of focusing control signal F and tracking control signal T is applied to the B coil.

$$A=F-T, B=F+T$$

The sum of the signals which are applied to the two coils is $$B+A=(F+T)+(F-T)=2F$$

to transfer the objective lens in the focusing direction.
The difference of the signals which are applied to the two coils is $$B-A=(F+T)-(F-T)=2T$$

to transfer the objective lens in the tracking direction.

The conventional optical pickup apparatus having the above-mentioned the optical pickup actuator will be described in detail with reference to FIG. 2.

FIG. 2 is a schematic view for showing a conventional optical pickup apparatus.

One laser diode 10 is provided as a light source to emit a laser beam. The laser beam emitted from laser diode 10 is reflected from a beam splitter 11 to be bent by 90°. This beam is changed into parallel beams through collimator lens 12. Then the beam is diffracted through hologram device 13. The diffracted beam can be focused on disc D1 or D2 by going through objective lens 14. An optical pickup actuator 19 is installed around objective lens 14 so that the laser beam can be minutely focused on the disc D1 or D2. Hologram device 13 has hologram lattices 15 formed on the central part of its surface.

Hereinafter, an operation of the above-mentioned optical pickup apparatus will be described.

The disc, for example, 1.2 mm disc D1 is loaded in deck which is operated by dual-focusing method. The laser beam is emitted from laser diode 10. The laser beam emitted from laser diode 10 is reflected from a beam splitter 11 to be bent by 90°. This beam is changed into parallel beams through collimator lens 12. After the parallel beam is diffracted through hologram device 13, the beam passes through objective lens 14. The diffracted beam may be focused on a pit of 1.2 mm disc D1.

At this time, one part of the beams incident on the hologram device through objective lens 14 is diffracted through hologram lattices 15, and it is efficient only the first order diffracted beam among the diffracted beams. That is, the first-order diffracted beam with the greater focal distance is focused on the pit of 1.2 mm disc D1. Thus, the reflected beam is returned toward beam splitter 11. The beam is received on photodiode 17 via beam splitter 11 to be used in reproducing information. The optical pickup actuator 19 carries out the minute tracking and focusing servo controls on the minute tracking and focusing errors made in reproducing information.

Meanwhile, when 0.6 mm disc D2 is loaded in deck which is operated by dual-focusing method, it is efficient only the zeroth-order diffracted beam, i.e. the non-diffracted beam. That is, the zeroth-order diffracted beam with the smaller focal distance is focused on the pit of 0.6 mm disc D2.

Thus, the optical pickup apparatus is operated the same manner as in 1.2 mm disc D1 to reproduce information on 0.6 mm disc and to carry out tracking and focusing servos.

In the conventional optical pickup apparatus for dual-focusing, it is difficult to make the hologram device which forms dual focuses. Thereby, there is the problem that the manufacturing cost of the optical pickup apparatus for dual-focusing is increased.

Since the conventional optical pickup apparatus for dual-focusing has a collimator lens as well as hologram, there is the problem that the whole construction of the optical pickup apparatus is complicated.

SUMMARY OF THE INVENTION

The present invention is intended to overcome the above-mentioned and numerous other disadvantages and deficiencies of the prior art. Therefore, it is an object of the present invention to provide an optical pickup apparatus having an objective lens positioning system which the objective lens is transferred by a transferring means mounted at the objective lens so that accurate focusing is carried out when the disc is changed in thickness.

To achieve the above object of the present invention, there is provided an optical pickup apparatus having an objective lens positioning system which comprises:

a laser source;

a beam splitting means which makes a laser beam from the laser source go toward an optical disc;

an objective lens positioning system for transferring the objective lens in optical axis depending on a thickness of the optical disc in order to minutely focus on the optical disc; and a motor driving part for driving the objective lens positioning system.

The objective lens positioning systems comprise rack gears respectively connected to both sides of the objective lens and pinion gears engaged with the rack gears.

The objective lens positioning systems further comprise fixed supporting parts having guide rails formed thereon.

The rack gear has a projector extended in length which is slidably engaged with the guide rail.

The motor driving part comprises a detecting sensor for detecting a thickness of the disc and then generating a signal, a microprocessor for generating a focusing controlling signal on the basis of the generated signal from the detecting sensor, a focusing servo motor controlling part for generating a driving motor controlling signal on the basis of the controlling signal generated from the microprocessor, and a driving motor for transferring the objective lens by the controlling signal of the focusing servo motor controlling part.

The driving motor comprises a stepping motor.

According to the present optical pickup apparatus having an objective lens positioning system, in reproducing discs with different thicknesses, the objective lens is transferred by a transferring means mounted at the objective lens according to the thickness of the disc, and thereby focusing is easily and accurately accomplished regardless of thickness of disc.

BRIEF DESCRIPTION OF THE DRAWINGS

The present invention may be better understood and its numerous objects and advantages will be more apparent to those skilled in the art by reference to the accompanying drawings in which.

DESCRIPTION OF THE PREFERRED EMBODIMENTS

Hereinafter, the preferred embodiments of this invention will be described in detail with reference to the accompanying drawing.

Figure 1A:
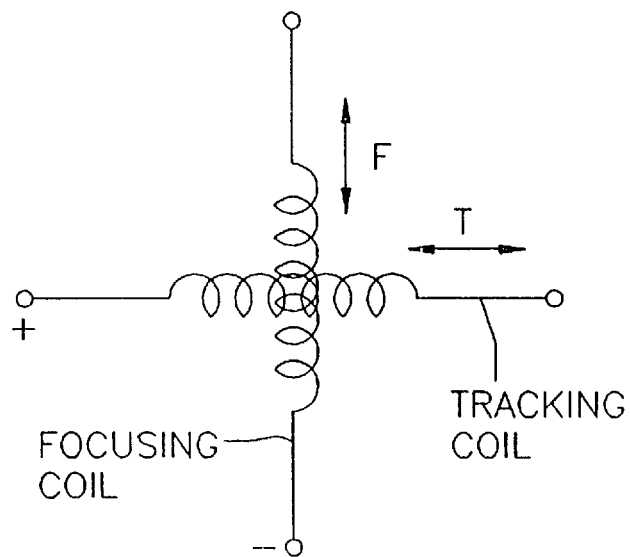
FIG. 1A is a schematic view for showing an embodiment of a conventional optical pickup actuator.
Figure 1B:
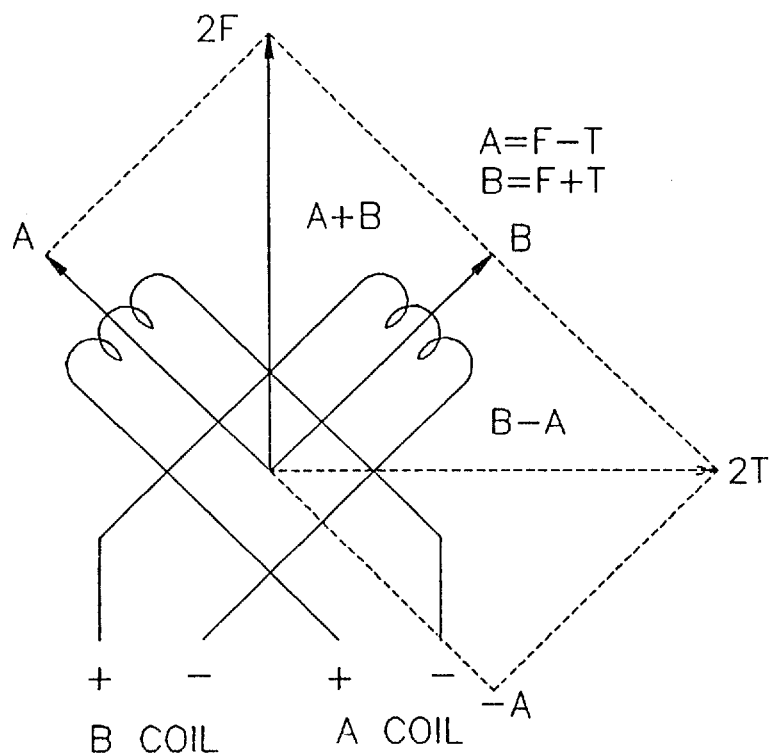
FIG. 1B is a schematic view for showing another embodiment of a conventional optical pickup actuator.
Figure 2:
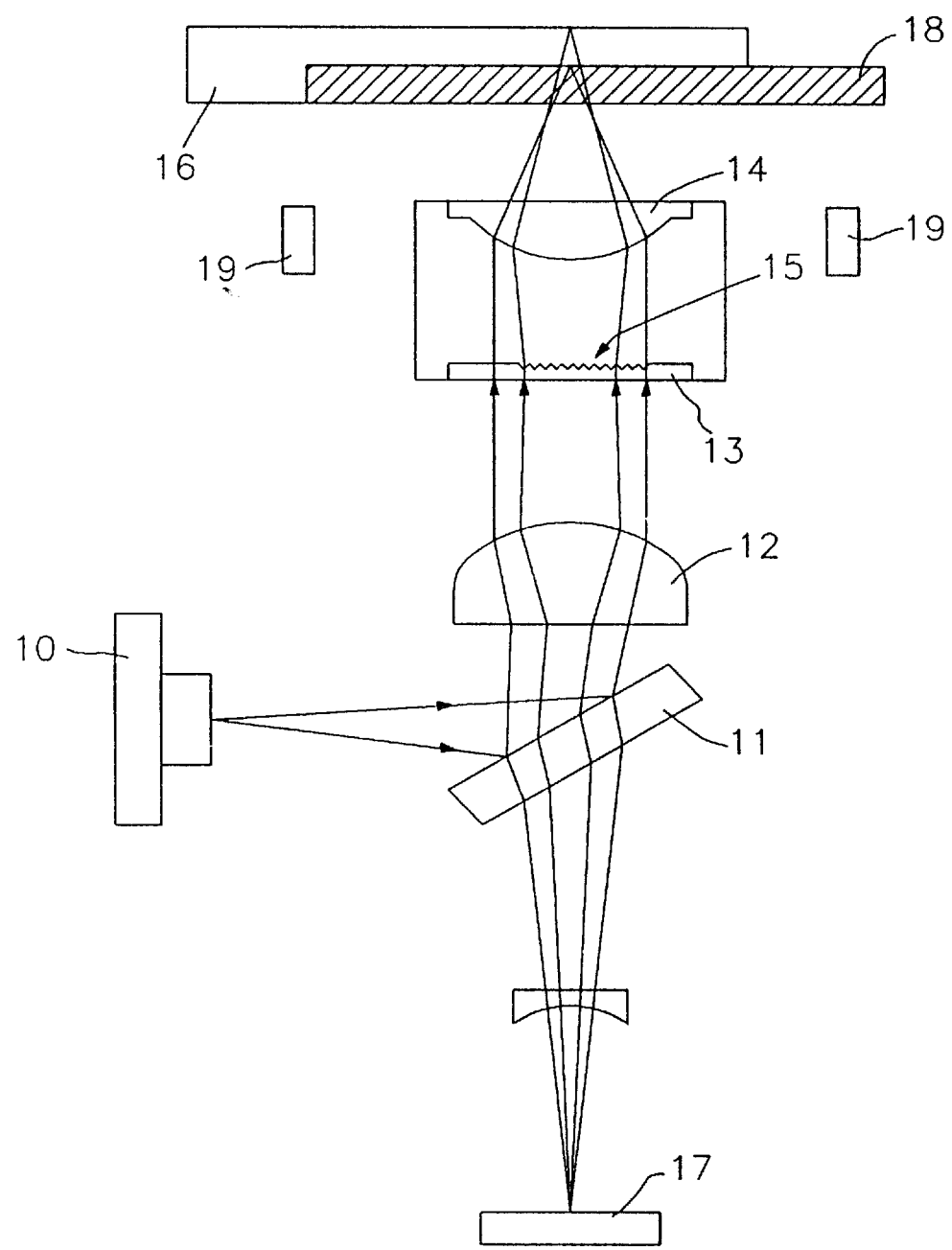
FIG. 2 is a schematic view for showing an optical pickup apparatus for dual-focusing.
Figure 3:
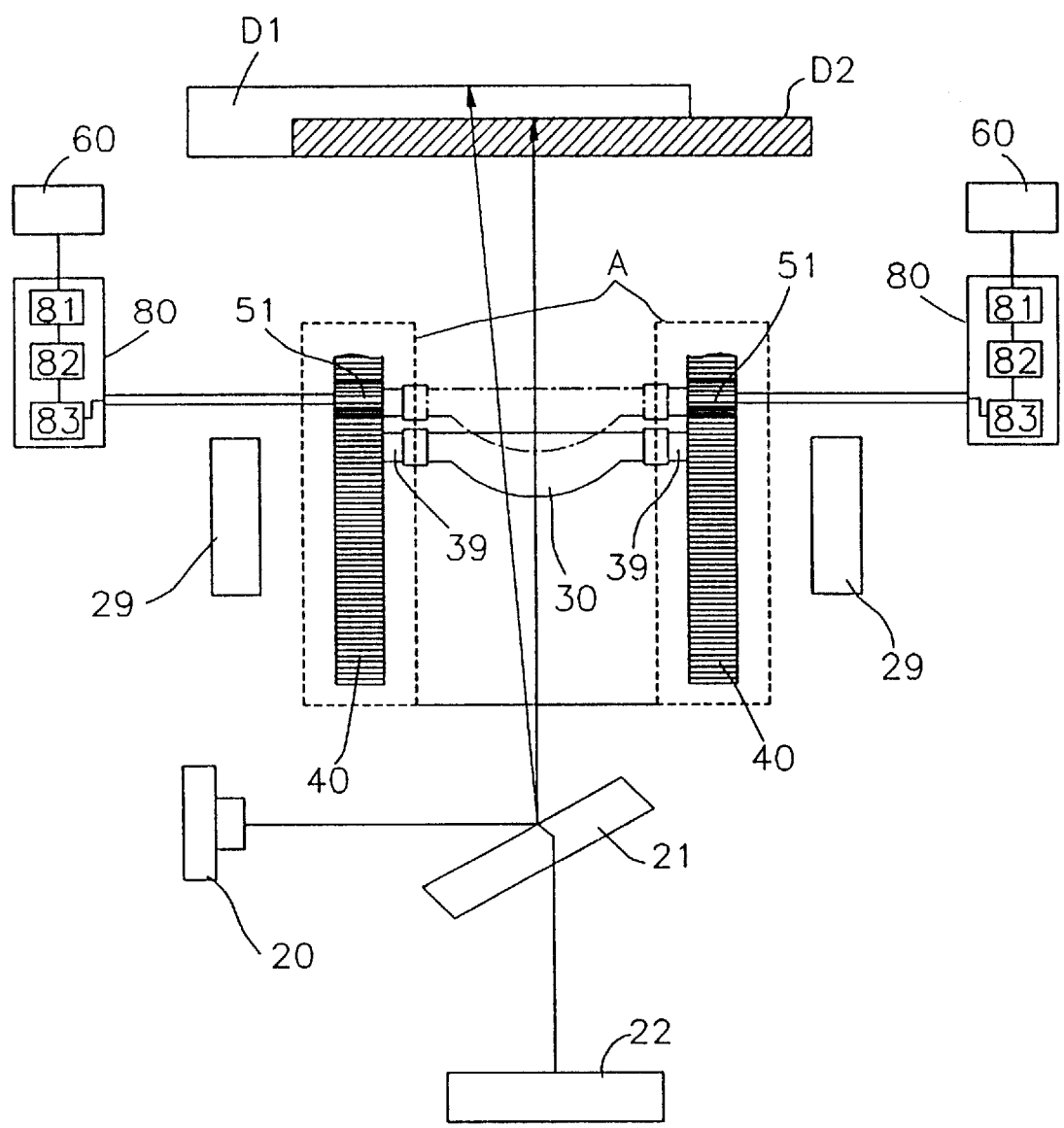
FIG. 3 is a schematic view for showing an optical pickup apparatus having an objective lens positioning system.
Figure 4A:
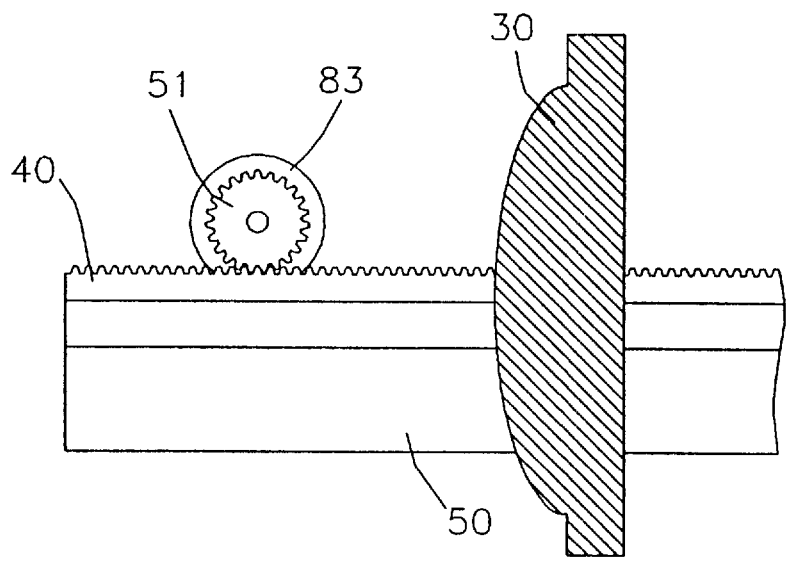
FIG. 4A is an enlarged side view for showing A block part in FIG. 3.
Figure 4B:
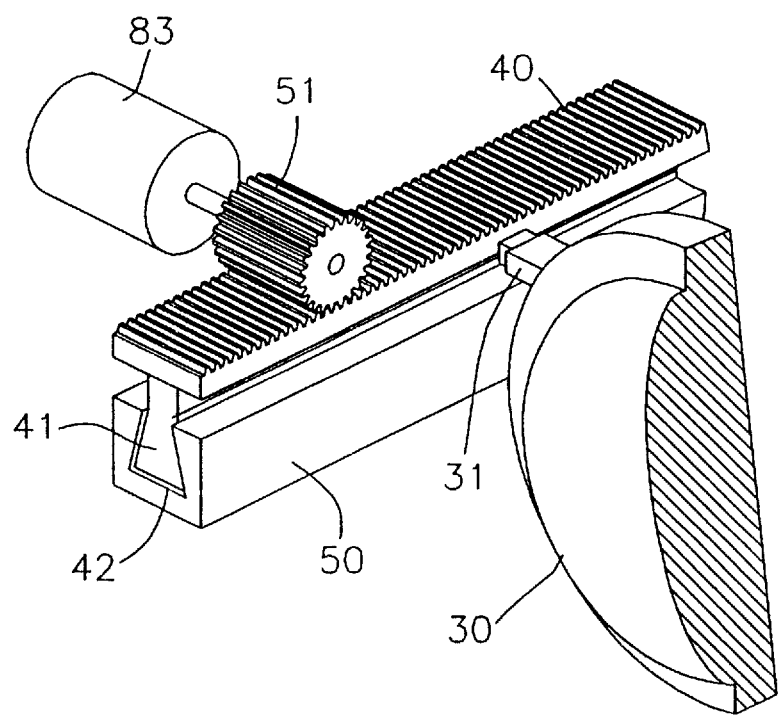
FIG. 4B is a perspective view for showing A block part in FIG. 3.

FIG. 3 is a schematic view for showing an optical pickup apparatus having an objective lens positioning system, FIG. 4A is an enlarged side view for showing A block part in FIG. 3, and FIG. 4B is a perspective view for showing A block part in FIG. 3.

A reference numeral 20 is a laser diode for emitting the laser beam. A beam splitter 21 is installed on the optical path in order that the laser beam emitted from laser diode 10 proceeds toward disc D1 and D2. To detect the thickness of disc, disc thickness detecting sensor 60 is installed around the position in which the disc is to be located. The disc thickness detecting sensor 60 detects whether the thickness of disc is 1.2 mm or 0.6 mm and outputs the detected signal.

An objective lens 30 is installed on the optical path between beam splitter 32 and disc D1 or D2. A fixing piece 31, 31 are integrally installed at both sides of the objective lens 30.

Objective lens positioning systems A, A are connected with fixing piece 31, 31. The objective lens positioning system A, A, as shown in FIGS. 4A and 4B, has rack gears 40, 40 parallel with the focusing direction. Since the rack gears 40, 40 is fixed with fixing piece 31, 31, when the rack gears 40, 40 is moved in vertical (focusing) direction, objective lens positioning systems A, A are moved at the same time, and thereby focusing control is carried out. Furthermore, objective lens positioning systems A, A have pinion gears 51, 51 engaged with the rack gears 40, 40, and fixed supporting parts 50, 50 having guide rails 42, 42 formed thereon, rack gears 40, 40 being slidable up and down according to rotation of the pinion gears 51, 51 by guide rails 42, 42. A projector 41, 41 are extended in length which are slidably engaged with the guide rails 42, 42 on the bottom of the rack gears 40, 40 in the vertical direction.

The objective lens positioning systems A, A have motor driving parts 80, 80 connected with pinion gears 51, 51. The motor driving part 80 is connected a detecting sensor 60 for detecting a thickness of the disc, and the motor driving part 80 comprises a microprocessor, a focusing servo motor controlling part, and a driving motor. Thus, a signal from detecting sensor 60 is received on microprocessor 81, and then the microprocessor 81 outputs a focusing control signal. A servo motor control part 82 controls a driving motor 83 according to the focusing control signal. A photodetector 22 is installed on the optical path of the reflected beam from disc D1 or D2, an optical pickup actuator 29 is installed around objective lens 30. The optical pickup actuator 29 can be minutely focused on the disc D1 or D2 on the basis of the laser beam received on the photodetector 22 in reproducing information.

Hereinafter, an operation of the optical pickup of the present invention will be described.

The disc, for example, 1.2 mm disc D1 is loaded in deck which is operated by dual-focusing method. The laser beam is emitted from laser diode 20. The laser beam emitted from laser diode 20 is reflected from a beam splitter 21 to be bent by 90°. The beam passes through objective lens 14. The beam may be focused on a pit of 1.2 mm disc D1.

At this time, detecting sensor 60 for detecting a thickness of the disc detects that the thickness of the disc D1 is 1.2 mm, and outputs the signal. The signal from detecting sensor 60 is received on microprocessor 81, and then the microprocessor 81 outputs a focusing control signal. A servo motor control part 82 controls a driving motor 83 according to the focusing control signal.

When driving motor 82 is driven, The pinion gears 51, 51 of the objective lens positioning system A connected with the driving motor 83 is rotated, for example, counterclockwise. Thereby, rack gears 40, 40 engaged with pinion gears 51, 51 are upwardly moved. Objective lens 30 connected with rack gears 40, 40 via fixing pieces 31, 31 is upwardly moved, so that the laser beam can be focused on a pit of 1.2 mm disc D1 which is located at greater distance from the optical pickup apparatus than 0.6 mm disc D2.

Thus, in the state that the laser beam is focused on 1.2 mm disc, the reflected beam from the disc D1 is returned toward beam splitter 21. The beam is received on photodetector 22 via beam splitter 21 to be used in reproducing information.

The optical pickup actuator 29 carries out the minute tracking and focusing servo controls on the minute tracking and focusing errors made in reproducing information.

Meanwhile, when 0.6 mm disc D2 is loaded in deck which is operated by dual-focusing method, detecting sensor 60 for detecting a thickness of the disc detects that the thickness of the disc D2 is 0.6 mm, and outputs the signal. The signal from detecting sensor 60 is received on microprocessor 81, and then the microprocessor 81 outputs a focusing control signal. A servo motor control part 82 controls a driving motor 83 according to the focusing control signal.

When driving motor 83 is driven, The pinion gears 51, 51 of the objective lens positioning system A connected with the driving motor 83 is rotated, for example, clockwise. Thereby, rack gears 40, 40 engaged with pinion gears 51, 51 are downwardly moved. Objective lens 30 connected with rack gears 40, 40 via fixing pieces 31, 31 is downwardly moved, so that the laser beam can be focused on a pit of 0.6 mm disc D2 which is located at smaller distance from the optical pickup apparatus than 1.2 mm disc D1.

Thus, in the state that the laser beam is focused on 0.6 mm disc, the reflected beam from the disc D2 is returned toward beam splitter 21. The beam is received on photodetector 22 via beam splitter 21 to be used in reproducing information.

The optical pickup actuator 29 carries out the minute tracking and focusing servo controls on the minute tracking and focusing errors made in reproducing information.

According to the present optical pickup apparatus having an objective lens positioning system, in reproducing discs with different thicknesses, the objective lens is transferred by a transferring means mounted at the objective lens according to the thickness of the disc, and thereby focusing is easily and accurately accomplished regardless of thickness of disc.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be constructed as encompassing all the features of patentable novelty that reside in the present invention, including all features that would be treated as equivalents thereof by those skilled in the art to which this invention pertains.

What is claimed is:

1. An optical pickup apparatus capable of focusing respectively onto optical discs with different thicknesses comprising:

a laser source;

a beam splitting means which makes a laser beam from the laser source go toward an optical disc;

an objective lens for focusing onto a recording surface of the optical disc;

an objective lens positioning system for transferring the objective lens in an optical axial direction depending on a thickness of the optical disc in order to minutely focus on the optical disc, the objective lens positioning system having rack gears respectively fixedly connected to both sides of the objective lens, pinion gears respectively engaged with the rack gears, and fixed supporting parts having guide rails formed in the optical direction, and thereby the rack gears being movable in the optical axial direction along the guide rails by a rotational movement of the pinion gears so the objective lens fixed to the rack gears is movable in the optical axial direction;

a motor driving part for driving the pinion gears of the objective lens positioning system in order to transfer in the optical axial direction the objective lens which is fixedly connected with the rack gears of the objective lens positioning system; and an objective lens actuator for moving the objective lens fixed to the rack gears of the objective lens positioning system, and thereby carrying out focusing and tracking servos during playing of the optical disc.

2. An optical pickup apparatus having an objective lens positioning system as claimed in claim 1, wherein the rack gears have a projector extended in length which is slidably engaged with the guide rails.

3. The optical pickup apparatus as claimed in claim 1, wherein the motor driving part comprises a detecting sensor for detecting a thickness of the disc and then generating a signal which is dependent on the thickness of the disc, a microprocessor for generating a focusing controlling signal on the basis of the signal generated from the detecting sensor, a focusing servo motor controlling part for generating a driving motor controlling signal on the basis of the focusing controlling signal generated from the microprocessor, and a driving motor for transferring the objective lens by the driving motor controlling signal of the focusing servo motor controlling part, so that the driving motor transfers the objective lens in the optical axial direction depending on the thickness of the disc.

4. The optical pickup apparatus having an objective lens positioning system as claimed in claim 3, wherein the driving motor comprises a stepping motor.

5. An optical pickup apparatus capable of focusing respectively onto optical discs with different thicknesses comprising:

a laser source;

a beam splitting means which makes a laser beam from the laser source go toward an optical disc;

an objective lens for focusing onto a recording surface of the optical disc;

an objective lens positioning system for transferring the objective lens in an optical axial direction depending on a thickness of the optical disc in order to focus on the optical disc, the objective lens positioning system having rack gears respectively fixedly connected to both sides of the objective lens, pinion gears respectively engaged with the rack gears, and fixed supporting parts having guide rails formed in the optical axial direction, in which the rack gears have a projector extended in the optical axial direction which is slidably engaged with the guide rails, and thereby the rack gears are movable in the optical axial direction along the guide rails by a rotational movement of the pinion gears so the objective lens fixed to the rack gears is movable in the optical axial direction;

motor driving means for driving the pinion gears of the objective lens positioning system in order to transfer in the optical axial direction the objective lens which is fixedly connected with the rack gears of the objective lens positioning system, wherein the motor driving means has a detecting sensor for detecting a thickness of the disc and then generating a signal which is dependent on the thickness of the disc, a microprocessor for generating a focusing controlling signal on the basis of the signal generated from the detecting sensor, a focusing servo motor controlling part for generating a driving motor controlling signal on the basis of the focusing controlling signal generated from the microprocessor, and a driving motor for rotating the pinion gears by the driving motor controlling signal of the focusing servo motor controlling part, so that the driving motor transfers the objective lens connected with the pinion gears in the optical axial direction depending on the thickness of the disc; and an objective lens actuator for moving the objective lens fixed to the rack gears of the objective lens positioning system, and thereby carrying out focusing and tracking servos during playing of the optical disc.

* * * * *